United States Patent [19]

Chrobak et al.

[11] Patent Number: 5,027,876
[45] Date of Patent: Jul. 2, 1991

[54] ENVIRONMENTAL TIRE

[75] Inventors: Dennis S. Chrobak, Silver Lake; John T. White, Norton, both of Ohio

[73] Assignee: The Goodyear Tire & Rubber Company, Akron, Ohio

[21] Appl. No.: 434,664

[22] Filed: Nov. 13, 1989

[51] Int. Cl.$^5$ .................. B60C 11/03; B60C 3/04; B60C 9/08

[52] U.S. Cl. .................. 152/209 R; 152/454; 152/560

[58] Field of Search .................. 152/209 R, 454, 560

[56] References Cited

U.S. PATENT DOCUMENTS

| | | | |
|---|---|---|---|
| D. 293,562 | 1/1988 | Fuzioka et al. | |
| D. 293,563 | 1/1988 | Fuzioka et al. | |
| 2,713,373 | 7/1955 | Daugherty | 152/454 |
| 4,082,132 | 4/1978 | Arai et al. | 152/454 |
| 4,289,184 | 9/1981 | Motomura et al. | 152/560 |
| 4,785,861 | 11/1988 | Fujiwara | 152/454 |
| 4,802,547 | 2/1989 | Nakasaki | 152/209 R |
| 4,811,771 | 3/1989 | Shoemaker et al. | 152/454 |
| 4,884,610 | 12/1989 | Saito | 152/454 |

FOREIGN PATENT DOCUMENTS

| | | | |
|---|---|---|---|
| 546975 | 8/1942 | United Kingdom | 152/209 R |
| 751641 | 7/1956 | United Kingdom | 152/209 R |
| 1297627 | 11/1972 | United Kingdom | 152/209 R |

OTHER PUBLICATIONS

Industrial & Specialty Tires Data Book pp. 17–26.

*Primary Examiner*—Michael W. Ball
*Assistant Examiner*—Mark Osele
*Attorney, Agent, or Firm*—David L. King; R. J. Slattery, III

[57] ABSTRACT

A low pressure radial ply tire (20) for light off-the-road use has tow radial carcass plies (22) oriented at a cord angle (CA) with respect to the Equatorial Plane (EP) from 65 to 85°. The tire is not reinforced by a belt reinforcing structure to allow the carcass (22) to compensate within the footprint of the tire under varying conditions. The tread (26) is provided with a number of holes (38) having a very shallow depth and spaced uniformly across the tread surface to increase flotation and wherein the net-to-gross is in the range of 0.63 to 0.77.

9 Claims, 6 Drawing Sheets

ENVIRONMENTAL TIRE

BACKGROUND OF THE INVENTION

This invention relates to pneumatic tires which will be used primarily in light off-the-road applications. More particularly this invention relates to tires where the environmental impact by the vehicle/tires is to be minimized, while still retaining traction, especially wet traction Examples of such uses are on all terrain vehicles and golf cars and other lawn or garden service vehicles.

In many off-the-road applications, the tires used on a vehicle utilize a wide open tread pattern with axially extending tread lugs which cut into the loose ground surface. Tires which utilize this approach are generally those known in the industry as Agricultural (tractor) tires and Off-the-road (Earthmover, dozers, etc.) tires. These tires are generally used on large vehicles and in applications where the damage or impact to the ground is of a secondary importance to traction.

Some smaller vehicles though, which are used primarily in off-the-road conditions, i.e., not primarily highway use, do not fall into either of the above categories in their use or in their environmental impact. Specifically All Terrain Vehicles (ATV) and golf cars are two such examples. Each uses a light weight vehicle that is primarily driven off the road where not only good traction characteristics are required, but also where the damage to the turf is best kept to a minimum. This is especially true of the golf car tires where much time and money is spent maintaining well conditioned grounds by country clubs and other owners of golf courses.

Damage to such grounds can occur as the tires of the car slip with respect to the turf. The slippage can be increased, and therefore the damage under wet conditions.

It is therefore desirous to produce a tire which will have a minimal impact on the turf of golf courses and other off-the-road applications to thereby reduce the damage thereto and the cost to repair such damage. It is believed that as a goal for such reduction in the damage of the turf that the effect of the tire upon the turf should approximate that of a human foot.

At least one study has indicated that the average human foot exerts 7.5 PSI of pressure while an individual is standing at rest. It is preferable then that in the static footprint, the tire should not exert more than 2.10 times the PSI of that of the average human footprint and preferably less.

The traditional golf car tire is a bias ply tire which is typically a ribbed tire, either with smooth ribs or with blading or sipes. Alternatively, tires have employed repeating block patterns and, in some ATV tires, lugs. The lugs in these tires have traditionally a nonskid which in some cases acts similar to those of the larger Agricultural or Off-the-road tires as they cut or bite into the ground. This can result in damage to turf and other ground conditions which may accelerate erosion.

It therefore would be advantageous to develop a tire which has good traction, especially wet traction, on turf. It is also desirous to provide a tire which has good traction characteristics while having a low environmental impact upon the ground and thereby minimizing the stress on grass blades in order to help assure their survivability.

It is believed that these and other considerations can be accomplished by a low pressure non-belt reinforced pneumatic radial ply tire for light off-the-road use comprising:

a circumferentially extending ground engaging tread portion, said tread portion having a plurality of voids spaced about said tread such that the net-to-gross is in the range of 0.63 to 0.77;

a pair of sidewalls, one said sidewall extending radially inward from each lateral edge of said tread to a bead portion having an inextensible bead therein:

two radial carcass plies, each extending from one said bead to the other said bead portion, said carcass plies comprising a plurality of cords laid at a cord angle from 65° to 85° with respect to the equatorial plane:

wherein the aspect ratio is in the range of 0.40 to 0.75.

BRIEF DESCRIPTION OF THE DRAWINGS

The following is a brief description of the drawings in which like parts may bear like reference numerals and in which.

DEFINITIONS

Figure 1:
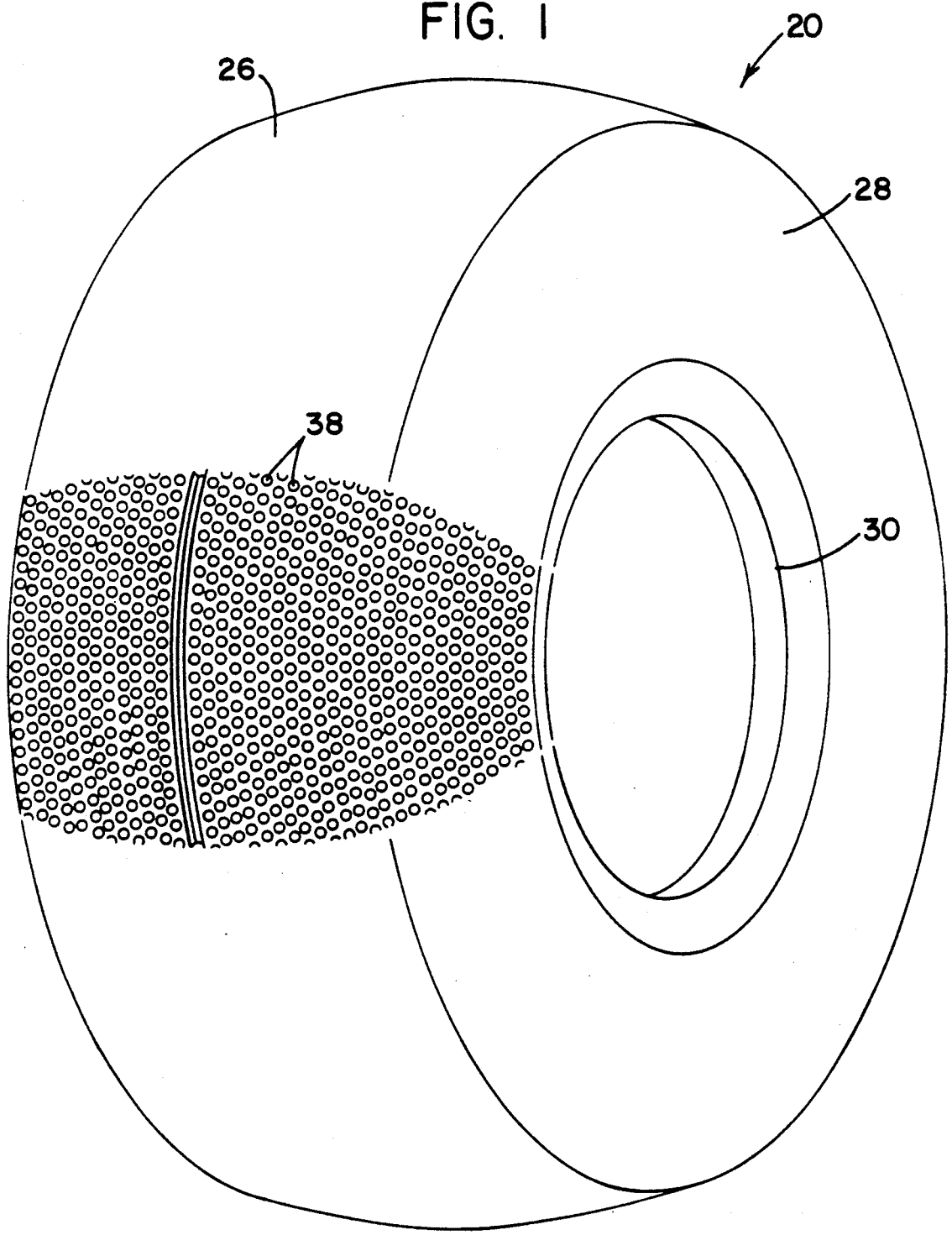
FIG. 1 is a perspective elevational view of a pneumatic tire according to one embodiment of the invention.

The following definitions are applicable to this specification, including the claims, wherein:

"Aspect ratio" of the tire means the ratio of its section height (SH) to its section width (SW) multiplied by 100% for expression as a percentage.

"Axial" and "axially" are used herein to refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt reinforcing structure" means at least two layers or plies of parallel cords, woven or unwoven, underlying the tread, unanchored to the bead, and having both left and right cord angles in the range from 17 degrees to 27 degrees with respect to the equatorial plane of the tire.

"Carcass" means the tire structure apart from the belt structure, tread, undertread, and sidewall rubber over the plies, but including the beads.

"Design rim" means a rim having a specified configuration and width.

"Design rim width" is normally the specific commercially available rim width assigned to each tire size and typically is between 80% and 90% of the specific tire's section width.

"Equatorial plane (EP)" means the plane perpendicular to the tire's axis of rotation and passing through the center of its tread.

"Footprint" means the contact patch or area of contact of the tire tread with a flat surface at zero speed and under normal load and pressure.

"Inner" means toward the inside of the tire and "outer" means toward its exterior.

"Net-to-gross ratio" means the ratio of the tire tread rubber that makes contact with the road surface while in the footprint, divided by the area of the tread in the footprint, including non-contacting portions such as grooves.

"Normal inflation pressure" refers to the specific design inflation pressure and load assigned by the appropriate standards organization for the service condition for the tire.

"Normal load" refers to the specific design inflation pressure and load assigned by the appropriate standards organization for the service condition for the tire.

"Radial" and "radially" are used to mean directions radially toward or away from the axis of rotation of the tire.

"Radial-ply tire" means a belted or circumferentially-restricted pneumatic tire in which the ply cords which extend from bead to bead are laid at cord angles between 65° and 90° with respect to the equatorial plane of the tire.

"Section height" (SH) means the radial distance from the nominal rim diameter to the outer diameter of the tire at its equatorial plane.

"Section width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Tire design load" is the base or reference load assigned to a tire at a specific inflation pressure and service condition: other load-pressure relationships applicable to the tire are based upon that base or reference load.

"Tread width" means the arc length of the tread surface in the axial direction, that is, in a plane passing through the axis of rotation of the tire.

"Tread arc width" (TAW) means the width of an arc having its center located on the plane (EP) and which substantially coincides with the radially outermost surfaces of the various traction elements (lugs, blocks, buttons, ribs, etc) across the lateral or axial width of the tread portions of a tire when the tire is mounted upon its designated rim and inflated to its specified inflation pressure but not subjected to any load.

"Unit tread pressure" means the radial load borne per unit area (square centimeter or square inch) of the tread surface when that area is in the footprint and the tire is loaded.

DETAIL DESCRIPTION OF THE INVENTION

Now referring to FIGS. 1-4, a tire, shown generally as reference numeral 20 is a radial-ply, pneumatic tire having two carcass plies 22 extending circumferentially about the axis of rotation of the tire and are anchored around a pair of substantially inextensible annular beads 24. A circumferentially extending tread portion 26 is located radially outwardly of the carcass plies 22. A sidewall portion 28 extends radially inwardly from each axial or lateral edge of the tread portion to an annular bead portion 30 having the beads 24 located therein.

The tire is not reinforced in the crown region with a belt reinforcing structure. It is believed that the elimination of the belt reinforcing structure helps in allowing the tire to better adapt the footprint of the tire to the load, thus increasing with load to help distribute the load over a larger area of contact. It is also believed that this helps in the traction, especially wet traction, and cornering capability of the tire. This is believed to be accomplished because the carcass plies being unrestricted, allow the tire to become more flexible.

The carcass plies 22 each comprise a plurality of parallel cords 32 laid at a radial cord angle CA, from 65° to 85° with respect to the equatorial plane EP. It being preferred that the CA of one ply 22a being equal to the cord angle CA of the other ply 22b but opposite in hand. It is still being more preferred that the cord angle (CA) be a low radial angle within the range from 65° to 75°, it being still more preferred to be in the range of 65° to 70°. It is important that the plies are less than 90° so that they will overlap one another. In other words the plies should cross reinforce one another. This is especially important because the tire does not contain a belt reinforcing structure. This makes the lower radial angles that much more important.

The ground engaging portion of the tread 26 is provided with a radius of curvature R1 which is from 8 to 10 times the section height SH of the tire. It is believed to be more preferred that the radius R1 be about 9 times that of the section height SH of the tire. The shoulders 36 of the tire are rounded, and are formed by a radius R2 which is from 34% to about 42% of the section height SH of the tire. It is believed that the rounded shoulders acting in cooperation with the unreinforced carcass plies further help make the tire progressive in the footprint, similar to that of a motorcycle tire. In this manner, more of the tread can be utilized within the footprint under certain operating conditions, one of which is cornering. In other words, the rounded shoulders allow for a redistribution of the footprint to include that of the shoulder areas under heavier load conditions and/or during cornering as the tire rolls onto the shoulder area. Furthermore, the rounded shoulders help eliminate or reduce turf damage.

Tires which have lugs, blocks or ribs which extend abruptly from the shoulders provide surfaces which may cut or dig into the ground and/or turf. Eliminating these sharp projections and providing a smooth transition into the sidewall helps to eliminate this problem. This can also be further enhanced by the use of the void areas as will be discussed below.

The sidewalls 28 are comprised by three other radii R3, R4, and R5. The radius R3 being from 65% to 80% of the section height SH. The radius R4 being from 97% to 119% of the section height while the radius R5 is from 18% to 27.5% of the section height.

Figure 5A:
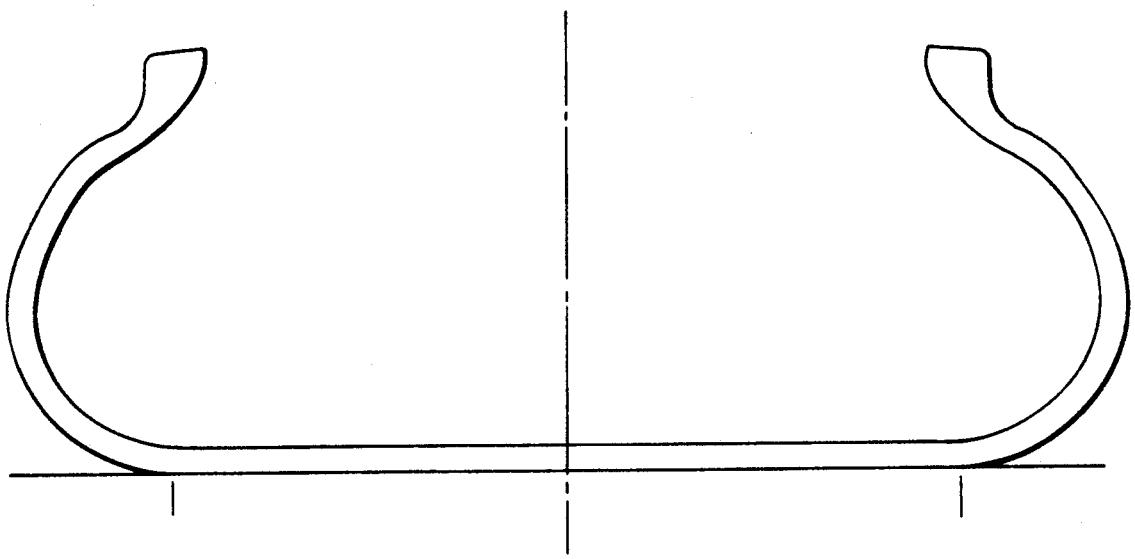
FIGS. 5a and 5b are a schematic of a partial profile of one tire according to the embodiment of FIGS. 1 and 2, inflated at 5 PSI and 10 PSI respectively.
Figure 5B:
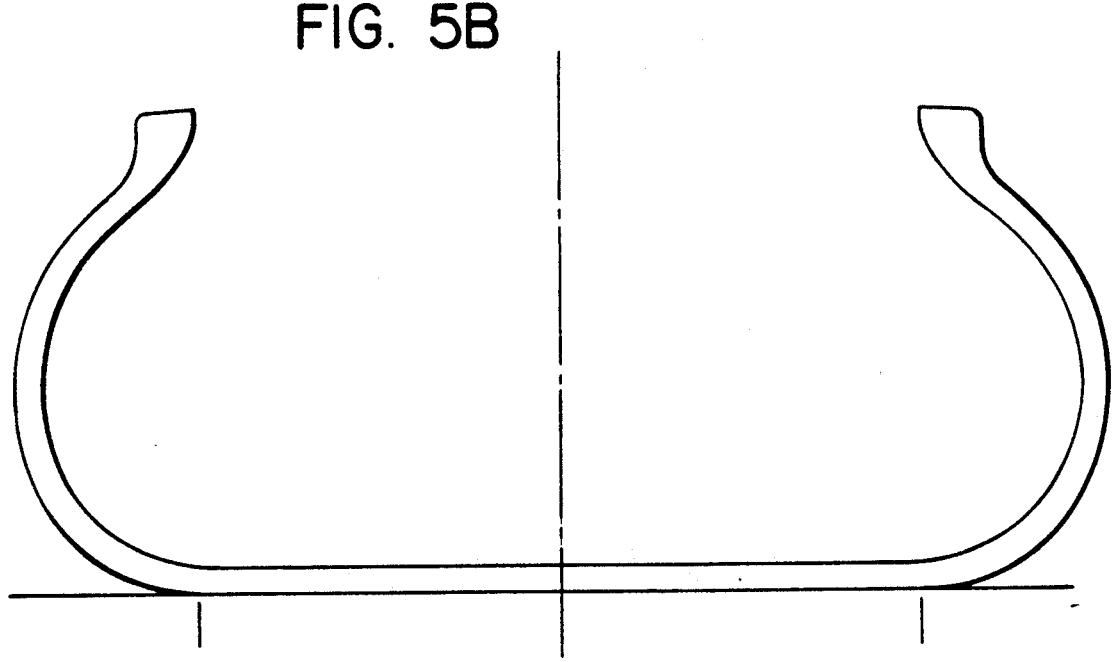

Referring to FIGS. 5a and 5b, there is illustrated two profiles of a tire according to the invention for an 18×8.50R8NHS tire loaded at 515 pounds. In FIG. 5a the tire is inflated at 5 PSI while in FIG. 5b the tire is inflated at 10 PSI. These profiles further help illustrate how the tire adapts as a function of air pressure and therefore in like manner as a function of varying load.

A tire according to the invention has an aspect ratio from 0.40 to 0.75. The more preferred range being from 0.48 to 0.60, with the most preferred being about 0.54. The relationship of the aspect ratio is believed to be important because of the potential for large diameter growth due to the absence of a belt reinforcing structure. For example the aspect ratio helps to compensate for the deflected load height of a vehicle. Furthermore, the lower aspect ratio tires further helps to distribute the load over a larger area and therefore a larger footprint. This in turn helps lower the unit tread pressure.

A tire according to the invention furthermore has a tread arc width TAW in the range of 38% to 48% of the maximum cross-sectional width SW of the tire.

The tire is a low pressure pneumatic tire. Low pressure, as defined herein, means that the normal inflation pressure of the tire is less than 12 PSI and preferably less than or equal to 10 PSI. The most preferred inflation pressure being 7 PSI. The tire, at rated load and inflation pressure, should have a unit tread pressure of less than or equal to 15.75 PSI. The most preferred unit tread pressure being approximately equal to that of the average human footprint and preferably less.

Referring to FIGS. 1, 2, 4, 6 and 7 the tread portion 26 is provided with a plurality of voids 38. The voids may be circular or hexagon in cross-section or other geometric shapes. It is preferred however, that the voids are a frustrum of a sphere, such as the dimples of a golf ball. The diameter D of the voids 38 is from 1.8% to 4.0% of the maximum section height SH of the tire, with the most preferred being about 2.2% to 3.5% of SH for tires having an aspect ratio less than or equal to 0.58.

The radial depth RD, the distance from the radially outermost surface 40 of the tread adjacent to a void 38 to the radially innermost portion 42 of the respective void being relatively small. For example it may be from about 12% to about 15% of the length or diameter D of the void. In other words, the radial depth may be from about 0.36% to about 0.60% of the maximum section height of the tire. The void may, for example, be formed by a radius R6 which is substantially equal to that of diameter D of the void. It is believed to be important to keep the diameter D and depth RD small in order to minimize the cutting surfaces and therefore the potential turf damage.

The net to gross of the tread is from about 0.63 to about 0.77. It is preferred that the voids are spaced uniformly about the tread, such as in rows and columns in order to provide a substantially uniform number per unit area (square centimeter or square inch). It is more preferred however that the area of the voids per unit area of the tread (per square inch or square centimeters) is substantially uniform or constant. In other words the area of voids or holes per unit area should not vary by about ±15%, it being more preferred to not vary ±10%, about the tread surface. This is believed to help distribute the load more uniformly in the footprint of the tire and thereby aiding the flotation thereof. Notwithstanding the above, the tire may be provided with a central channel 40 having a depth substantially equal to that of the voids. The channel results from the junction of the mold halves. This is a result of the difficulties in imparting a part of a void on each half and trying to assure a proper alignment. The uniform number of voids per unit tread area or the uniform area of voids per unit of tread is exclusive of this area.

Figure 2:
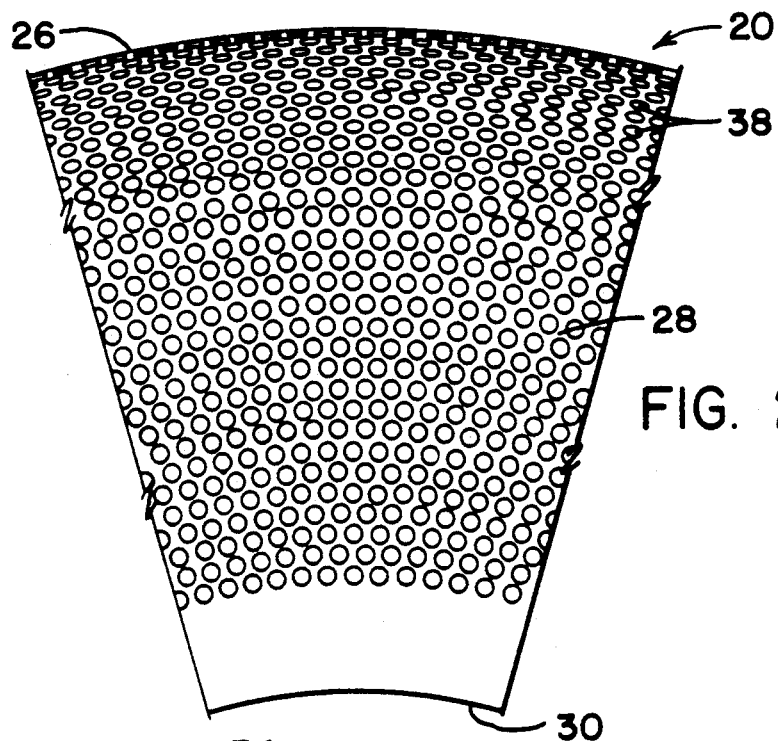
FIG. 2 is a fragmentary side view of the tire according to the embodiment of FIG. 1.
Figure 3:
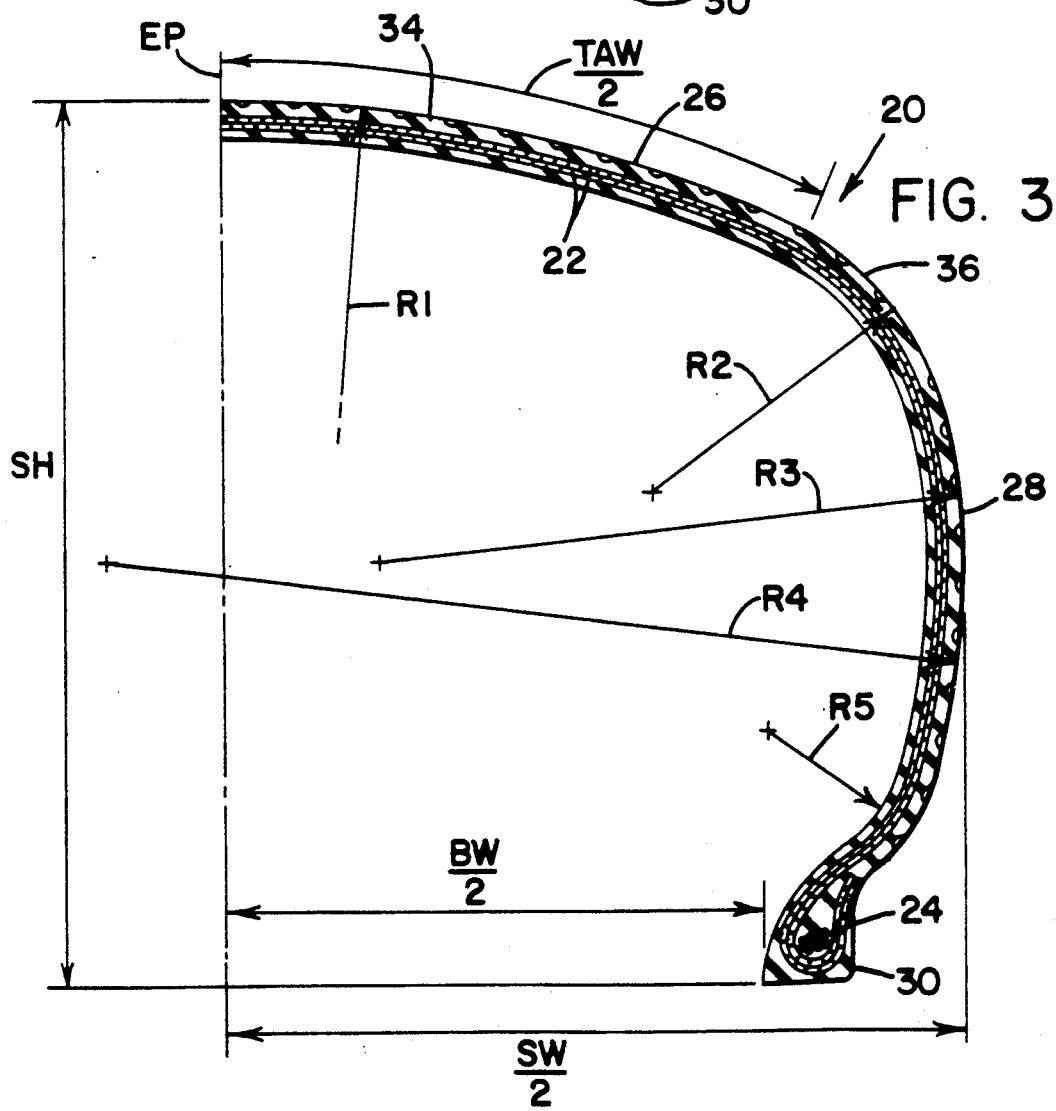
FIG. 3 is a half cross-section of the tire of FIGS. 1 and 2 taken from the Equatorial Plane EP axially outwardly.
Figure 4:
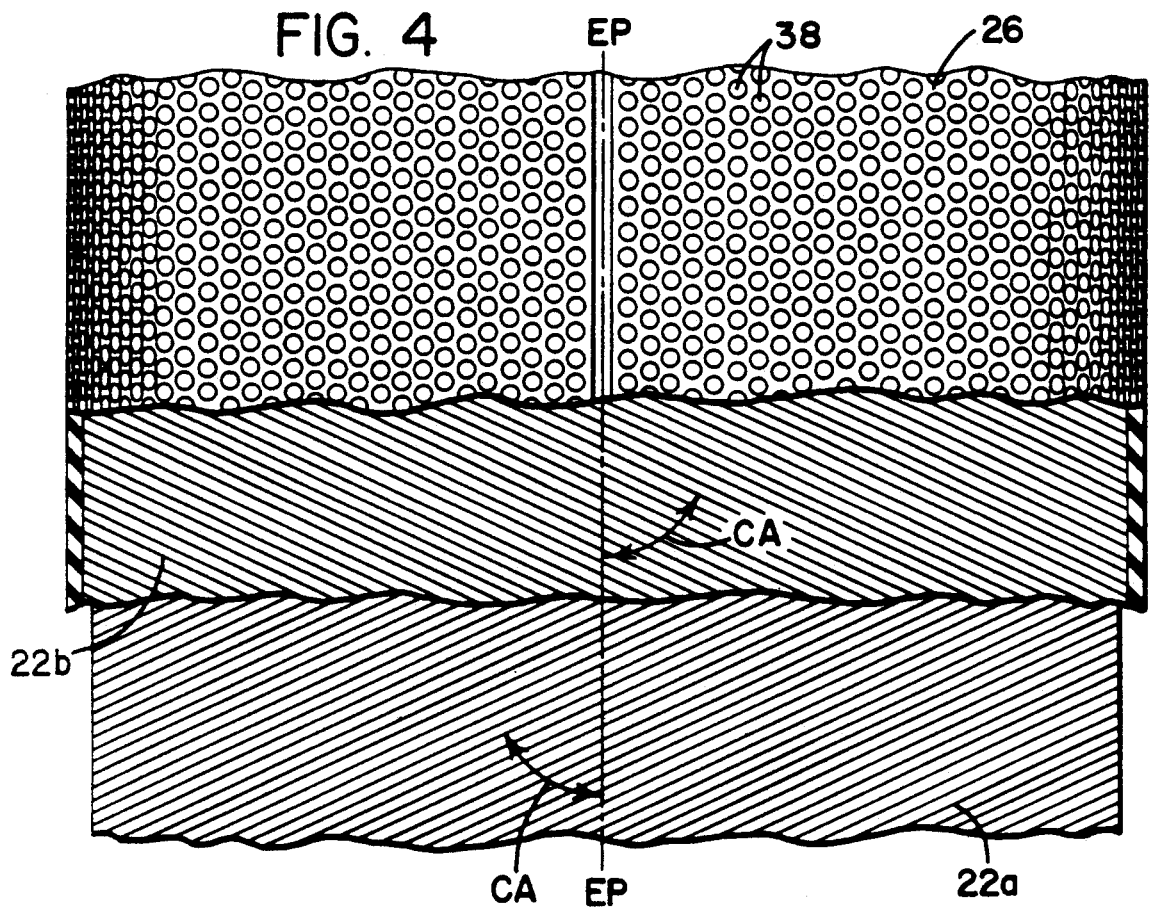
FIG. 4 is a fragmentary view of the tread portion and the underlining carcass plies.

The voids 38 should be located across the tread surface, including the shoulder regions, as a minimum. Alternatively, for appearance, the voids may extend from the shoulder regions into and including the sidewalls (28), such as for example, as illustrated in FIG. 2.

Figure 6:
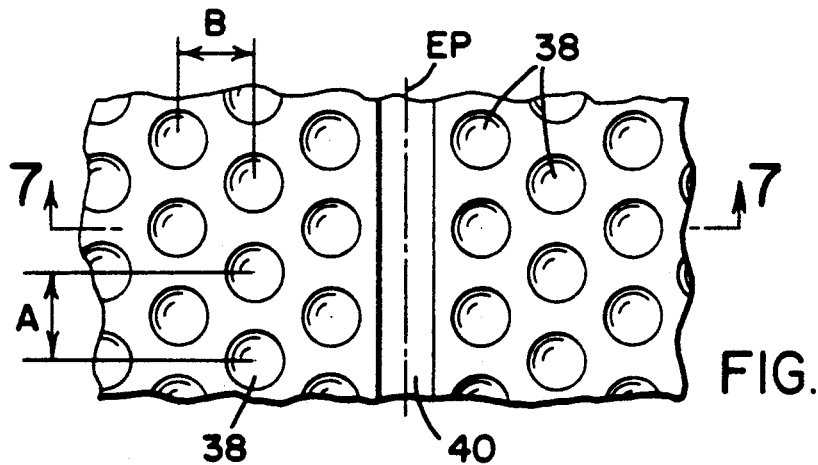
FIG. 6 is an enlarged fragmentary view of the tread portion of FIG. 1.
Figure 7:
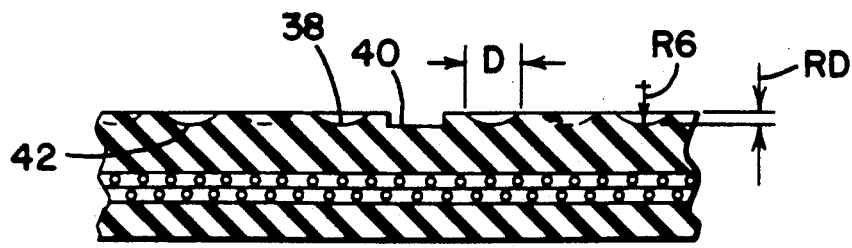
FIG. 7 is a sectional view of the tread taken along line 7-7 of FIG. 6.

It is preferred that the voids are placed in columns where they are in alignment with one another. In other words a line parallel to the equatorial plane EP can pass through the centers of each void of the column. In each column the circumferential spacing A is preferred to be about 102% to 125% of the diameter D of the voids, with the more preferred range being 115% ±5%. The voids of one column are preferably staggered with respect to those of the next adjacent column such that a void of one column is nested between a pair of voids of an adjacent column. The axial spacing B between adjacent columns may be such that a line parallel to the equatorial plane and tangent to the voids of one column do not intersect with voids of an adjacent column, for example, as illustrated in FIG. 6, or such that the voids 38a of one column do intersect with a portion of the voids 38b of an adjacent column such as in FIG. 8a, or may be tangent thereto. The axial spacing B may be in the range from about 88% to about 1.08% of the diameter of the voids. It being understood that the above description for columns could equally be applied for rows such that the layout of the voids would be rotated 90° with respect to the central channel 40 and the equatorial plane EP. In other words the voids could be arranged in staggered rows parallel to the axis of rotation instead of staggered columns.

Figure 8B:
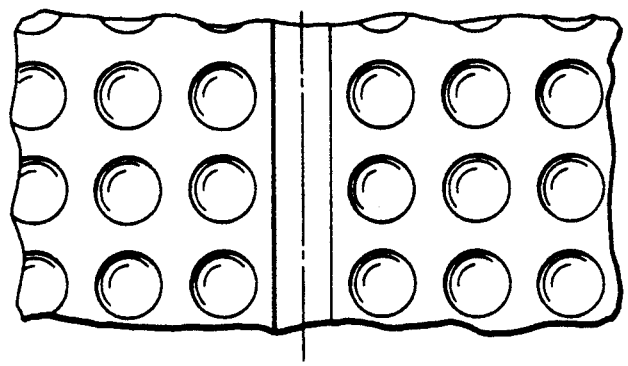
FIGS. 8A and 8B are fragmentary views of treads according to alternate embodiments of the invention.
Figure 8A:
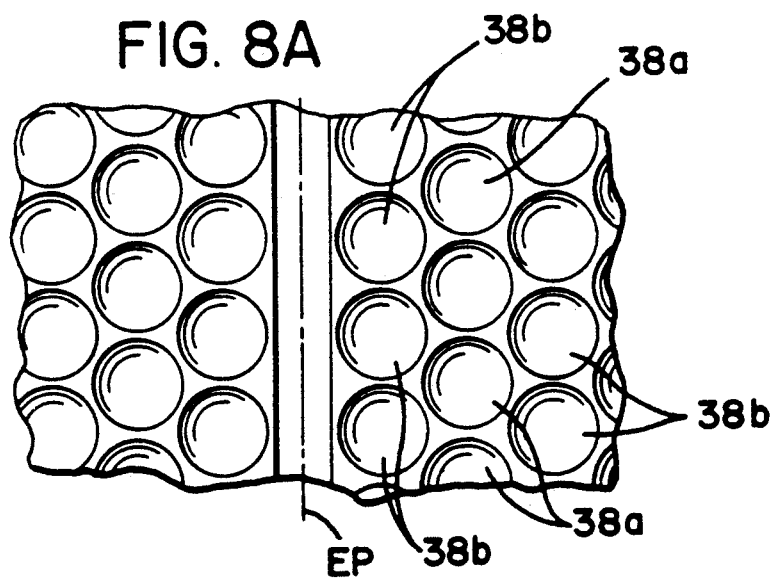

Also, while it is preferred that the voids are dispersed in staggered columns or rows they could be placed in alignment as shown in FIG. 8b.

Figure 9:
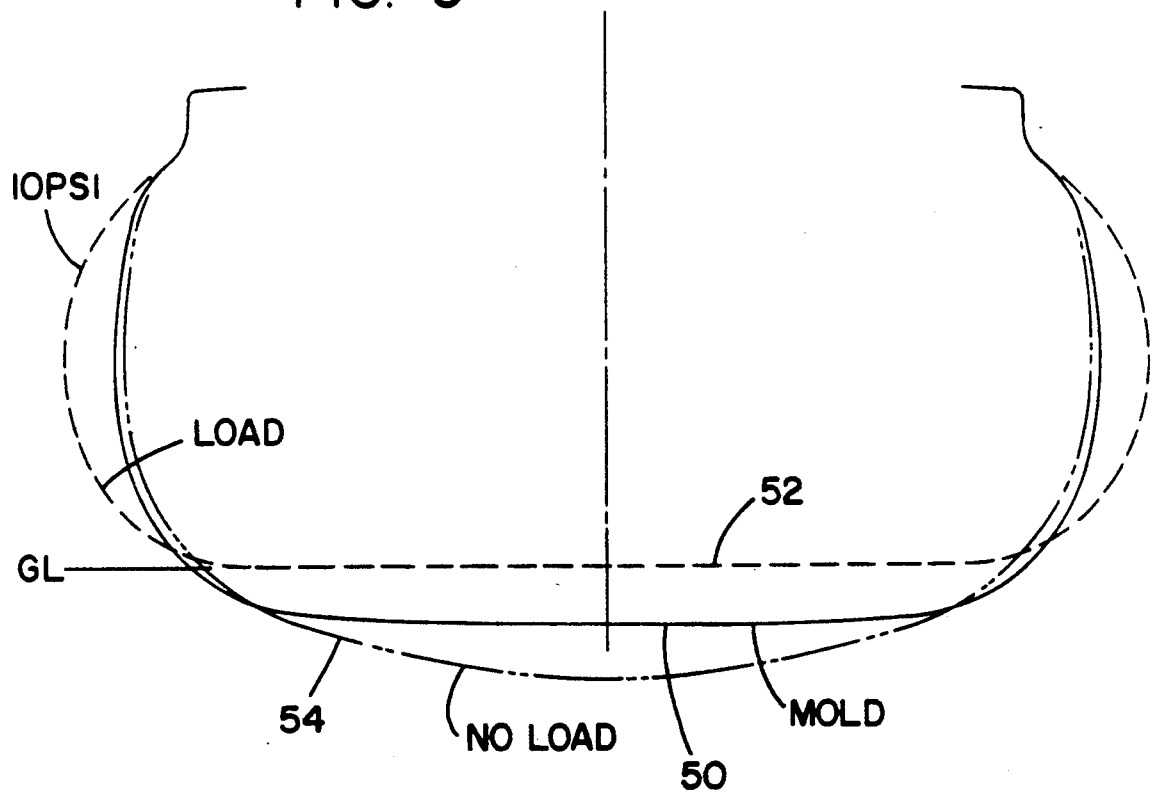
FIG. 9 is a schematic diagram of the profile of a tire loaded, unloaded and as molded.

Referring now to FIG. 9, it is preferred to mold the tire to a profile 50 which is halfway between the tire's predicted loaded 52 and unloaded 54 profiles in order to reduce the amount of tire flexure in any one direction as the tire is rotated through the footprint of the tire.

EXAMPLE

As a working example, 18×8.50R8 NHS 2PR tires have been built for golf cars as set forth in Table 1 below.

TABLE 1

| | |
|---|---|
| No. of Plies | 2 |
| Carcass plies | 8402 Nylon - 33 EPI |
| Cord angle CA | 65° |
| Maximum Section Height SH | 4.45 in. |
| Maximum Section Width SW | 8.30 in. |
| R1 | 40 in. |
| R2 | 1.7 in. |
| R3 | 3.252 in. |
| R4 | 4.8 in. |
| R5 | 1.0 in. |
| Aspect Ratio | 0.54 |
| Diameter of Hole D | 0.1–0.125 in. |
| RD | 0.02 in. |
| A | 0.17 in. |
| B | 0.147 in. |

Tires, as shown in Table 1 were placed on an E-Z GO Golf Car and tested on a golf course against two different control tires mounted on similar golf cars. Control tire #1 being a ribbed bias tire having axial bladding while control tire #2 being a ribbed bias tire having circumferential zig-zag grooves and circumferential bladding. The turf of the test area was dry to marshy n the low areas while the terrain was slight rolling hills. A subjective rating from 1-5 (5 being the best) was given for each evaluated characteristic with the average results shown in Table 2. The tire according to this invention had good ride, concerning and wet traction characteristics but also showed improved turf damage.

TABLE 2

|  | Control #1 | Control #2 | Invention |
|---|---|---|---|
| WET TRACTION | 4.2 | 4.2 | 4.6 |
| TURF DAMAGE | 3.0 | 2.2 | 4.2 |
| CORNERING | 3.4 | 3.6 | 4.8 |
| PUNCTURE RESISTANCE | 5.0 | 4.0 | 4.0 |
| RIDE | 3.4 | 3.6 | 4.8 |
| OVERALL INDEX | 3.4 | 3.52 | 4.48 |

While certain representative embodiments and details have been shown for the purpose of illustrating the invention, it will be apparent to those skilled in this art that various changes and modifications may be made therein without departing from the scope of the invention.

It is claimed:

1. A low pressure pneumatic non-belt reinforced radial ply tire for light off-the-road use comprising
   a circumferentially extending ground engaging tread portion, formed by a radius of 8 to 10 times the section height of the tire, said tread portion having a plurality of voids spaced about said tread such that the net-to-gross is in the range of 0.63 to 0.77;
   a pair of sidewalls, one said sidewall extending radially inward from each lateral edge of said tread to a bead portion having an inextensible bead therein;
   two radial carcass plies, each extending from one said bead to the other said bead portion, said carcass plies comprising a plurality of cords laid at a cord angle from 65° to 85° with respect to the equatorial plane;
   wherein the tire has rounded shoulders formed by a radius of 34% 42% of the section height of the tire, and the aspect ratio of the tire is in the range of 0.40 to 0.75; and
   wherein the tire at rated load and inflation pressure has a unit tread pressure of less than 15.75 psi.

2. The tire according to claim 1 wherein the voids have a diameter from 1.8% to 4% of the section height of the tire.

3. The tire according to claim 2 wherein the depth of said voids is from 12% to 15% of the diameter of the void.

4. The tire according to claim 3 wherein said cord angle is from 65° to 75°.

5. The tire according to claim 4 wherein said cord angle is about 65°-70°.

6. The tire according to claim 4 wherein the voids are dimples.

7. The tire according to claim 4 wherein the voids are hexagonal.

8. The tire according to claim 4 wherein the tire has a substantially constant number of voids per unit tread area.

9. The tire according to claim 4 wherein the depth of the voids is from 0.36% to 0.6% of the maximum section height of the tire.

* * * * *